United States Patent
Horvath

[15] 3,664,908
[45] May 23, 1972

[54] METHOD OF MAKING MOLDED LAMINATE PACKING

[72] Inventor: Guy E. Horvath, Williamsville, N.Y.

[73] Assignee: Hercules Packing Corporation, Alden, N.Y.

[22] Filed: June 25, 1969

[21] Appl. No.: 836,252

[52] U.S. Cl. ............... 161/113, 161/88, 161/116, 161/125, 161/145, 156/211, 156/245, 156/268
[51] Int. Cl. .......................................... B32b 3/10
[58] Field of Search ............... 161/88, 109, 112, 115, 116, 161/117, 39, 113, 96; 156/244, 211, 242, 245, 193, 222, 268

[56] References Cited

UNITED STATES PATENTS

| | | |
|---|---|---|
| 3,303,255 | 2/1967 | Bracey ............... 156/222 X |
| 3,312,582 | 4/1967 | Allan et al ............... 156/222 X |
| 3,216,468 | 11/1965 | Allan ............... 156/222 X |
| 3,340,135 | 9/1967 | Avery ............... 156/222 X |
| 3,509,990 | 5/1970 | Piazze ............... 156/222 X |
| 2,255,504 | 9/1941 | Current ............... 156/193 |

*Primary Examiner*—Benjamin R. Padgett
*Assistant Examiner*—Stephen J. Lechert, Jr.
*Attorney*—John L. Hutchinson, William Lohff and Alan M. Abrams

[57] ABSTRACT

A molded laminate packing composed of a plurality of coated fabric layers having a uniform disposition or arrangement of such fabric layers so as to achieve improved physical properties for such packing and a method for preparing such packing.

16 Claims, 12 Drawing Figures

Patented May 23, 1972
3,664,908
3 Sheets-Sheet 1
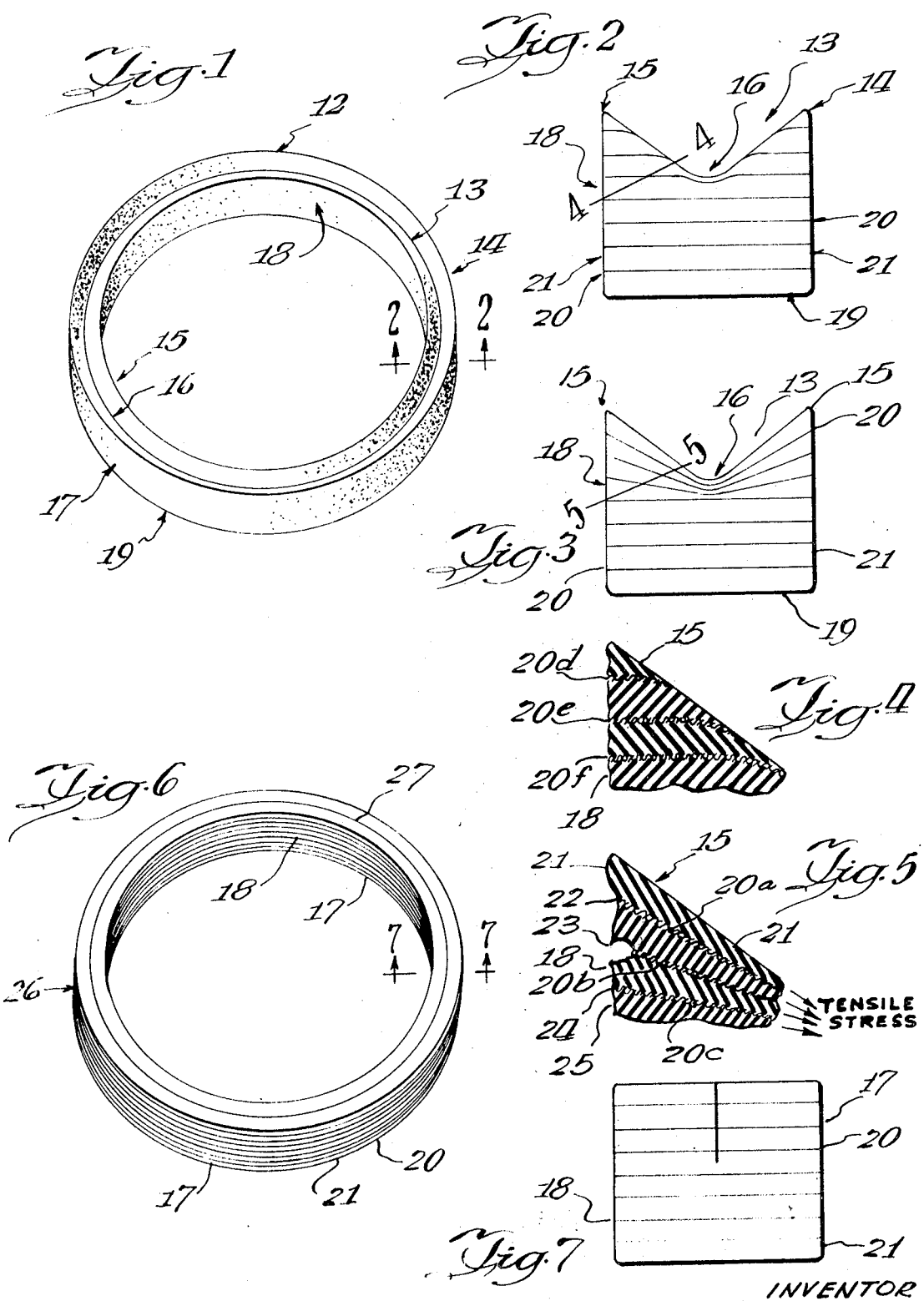
INVENTOR
Guy E. Horvath
BY Alan M. Abrams
ATTORNEY Patented May 23, 1972
3,664,908
3 Sheets-Sheet 2
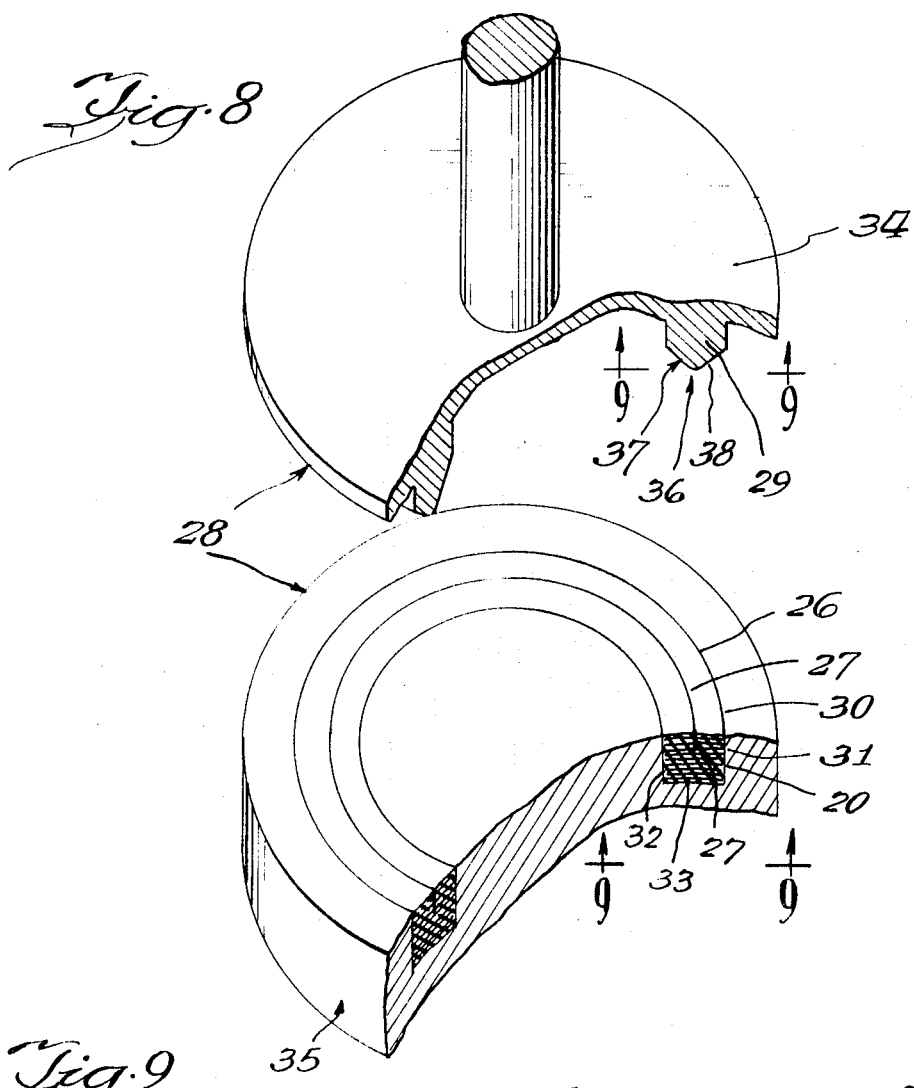
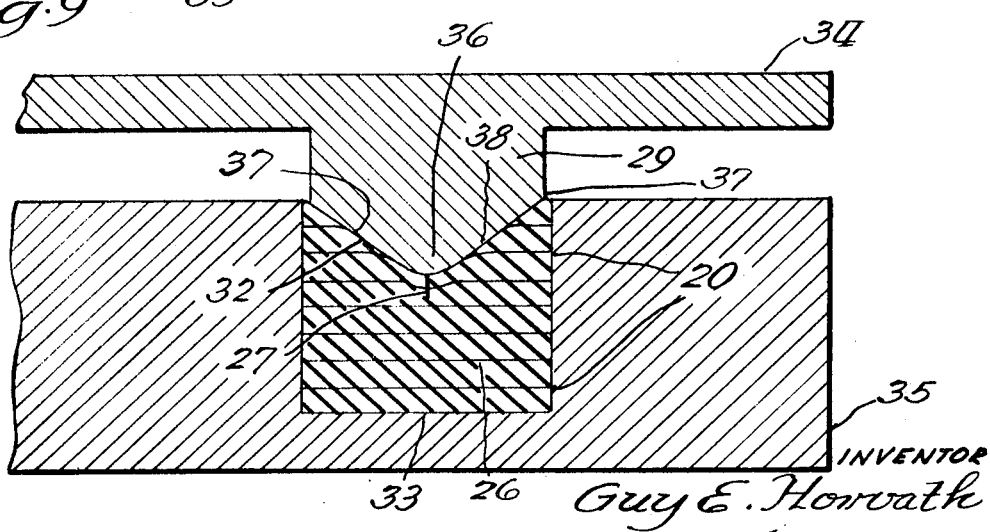
INVENTOR
Guy E. Horvath
BY Alan M. Abrams
ATTORNEY Patented May 23, 1972

3,664,908

INVENTOR
Guy E. Horvath
BY Alan M. Abrams
ATTORNEY

METHOD OF MAKING MOLDED LAMINATE PACKING

This invention relates to molded laminate packing or gasket material. More particularly, this invention relates to an improved packing having an annular recessed ring shaped configuration which is prepared by molding a plurality of elastomer coated fabric layers into a unitary article or body having such configuration and to methods for making such improved packing.

Molded laminate material which is prepared by molding, under elevated temperature and pressure, a plurality of elastomer coated fabric layers into a unitary body of desired shape or configuration has been a standard form of packing or sealing-gasket material for many years. Such packing material particularly that which is shaped during its molding preparation into an annular ring configuration having a concentric recess or groove on one surface has won wide acceptance as packing or sealing material for reciprocating rods, plungers or cylinders driven by high pressure fluids. These concentrically recessed packing rings, conventionally described as Vee rings or U rings, provide excellent automatic sealing in dynamic application. By virtue of their geometrical shape and their laminate structure, they are highly sensitive to pressure changes. They insure a complete seal at raised operational pressures and quickly resume their initial shape or configuration under reduced pressure so as to maintain both friction and wear at a minimum.

While these ring shaped packings are of superior utility as packing-sealing material in a variety of dynamic applications, they nevertheless suffer from certain limitations or drawbacks which adversely inhibit their full desired utilization. Foremost of these are undesirable wear characteristics and a tendency to delaminate at their sealing or wearing surface in contact with the moving cylinder or piston. This delamination or separation of the fabric layers most usually occurs at the wearing surface of the portions of the packing forming the projections which bound or define the recess or groove. These undesirable performance characteristics are primarily due to or result from the conventional method employed to prepare this type of packing material.

In the molding preparation of this type of packing, the elastomer coated fabric layers, particularly those ultimately located within the projections defining the groove or recess, are substantially dislocated or distorted during the compression step of the molding operation from their desired uniform and parallel spaced relationship to each other and from essentially a perpendicular disposition, especially at their terminal or end points, with respect to the wearing surface. This dislocation of the fabric layers from a uniform arrangement adversely affects the desired physical properties of the molded packing and is primarily responsible for the aforementioned undesirable physical characteristics. While this conventional molding method of preparation results in these physical properties, it nevertheless is still employed, because of its ease and simplicity, as the principal method for preparing this highly important industrial packing.

Accordingly, it an object of this invention to provide a molded laminate packing material having improved physical properties and stability, particularly increased resistance to wear and delamination. Another object is to provide a molded laminate packing having an improved arrangement or distribution of the laminate fabric layers especially within the portion of the packing forming the projections which bound or define the recess of such packing. A further object is to provide a method for preparing such improved molded laminate packing which is both economical and readily carried out and additionally does not involve a major departure from the methods conventionally employed to prepare such packing.

These and other objects of this invention will be apparent from the following further detailed description thereof taken together with the attached illustrated drawings.

IN THE DRAWINGS

FIG. 1 is a perspective view of a molded laminate packing having an annular ring configuration and illustrates the concentric recess on one surface thereof.

FIG. 2 is a sectional view taken on a line 2—2 of FIG. 1 but on a larger scale showing the fabric layers as arranged in the molded laminate packing according to this invention.

FIG. 3 is a sectional view taken on a line 2—2 of FIG. 1 in a fashion similar to FIG. 2 but illustrating the arrangement of the fabric layers as they typically exist in conventional molded laminate packing.

FIG. 4 is an exaggerated view of a portion of FIG. 2 bounded by line 4—4.

FIG. 5 is an exaggerated view of a portion of FIG. 3 bounded by line 5—5 and similar to FIG. 4.

FIG. 6 is a perspective view of a blank or preform in annular ring configuration composed of a plurality of elastomer coated fabric layers for use in preparing the molded laminated packing illustrated in FIG. 1 and having a slit according to this invention.

FIG. 7 is a view taken on a line 7—7 of FIG. 6 illustrating the arrangement of the elastomer coated fabric layers and the slit in the blank according to this invention prior to the molding of such blank to form the unitary, molded laminate packing as illustrated in FIG. 1.

FIG. 8 is a perspective view in partial cross section of a molding apparatus in open position illustrating the blank of FIG. 6 inserted into a die-cavity in a spaced relationship to an overhead associated die-plunger.

FIG. 9 is a sectional view taken as along line 9—9 of FIG. 8 and illustrating the molding apparatus of FIG. 8 in a substantially closed or compression position showing the arrangement of the blank of FIG. 6 and the die-plunger forming the recess as shown for the packing of FIG. 1.

Figure 12:
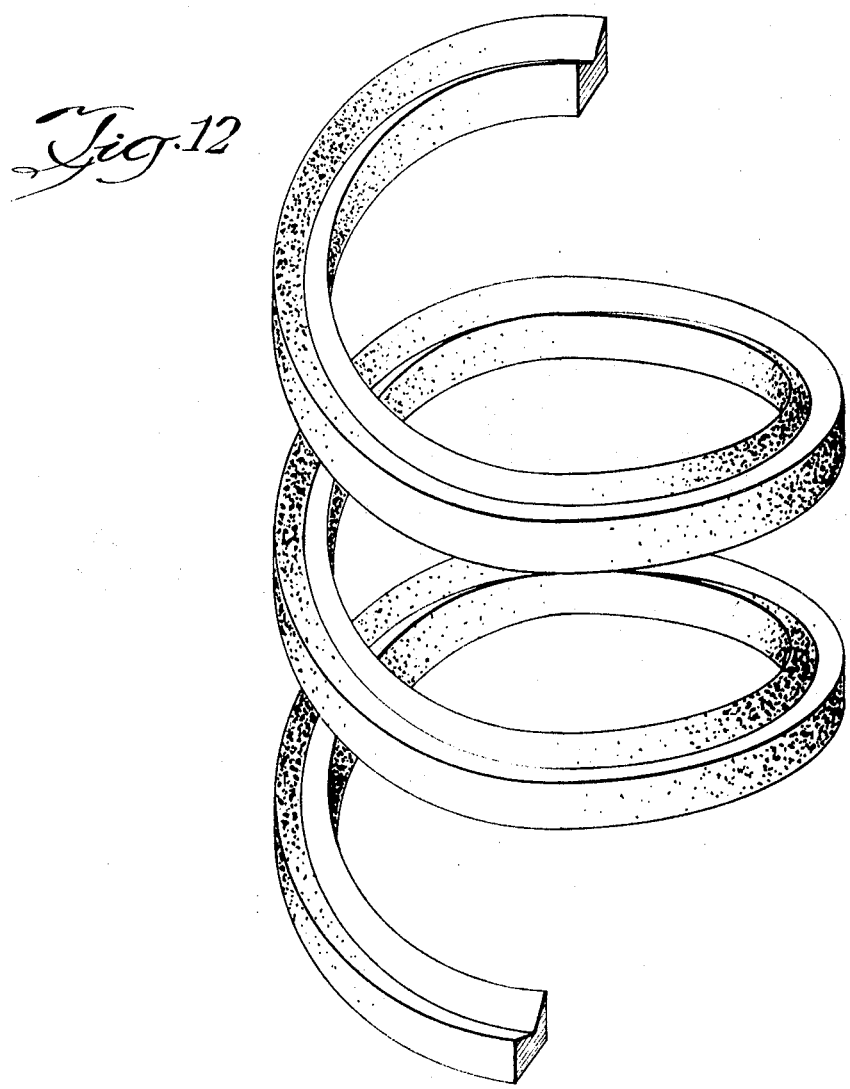
FIG. 12 is a perspective view of another alternate packing of this invention shown as a spiral coil.

Referring specifically to FIG. 1, the molded laminate packing 12 is illustrated in a preferred form as an annular ring with a concentric recess or groove 13 on one surface of the ring. The recess 13 is bounded or defined by portions of the packing forming projections 14 and 15 and the apex 16 of the recess 13 is shown preferably located approximately midway between the two side walls 17 and 18 of the ring, both walls shown in substantially a vertical disposition. Internal side wall 18 forms the wearing surface of the ring packing 12 and the surface or bottom 19 of the packing 12 is shown essentially horizontal or flat.

In operation, the ring packing 12 is employed, usually in combination with a plurality of similar packings nestled together, about a reciprocating, annular rod or cylinder (not illustrated) with the wearing surface or sidewall 18 positioned concentrically about such annular rod or cylinder. Sidewall 17 may also be considered as a wearing surface for the ring packing 12 and it is usually in contacting communication with a restraining means hereinafter discussed. The ring packing 12, or the plurality or nest of such rings, is typically held in fixed position about the rod or cylinder by any number of conventional restraining means or devices such as a stuffing box (not illustrated) and serves to prevent any loss or escape of high pressure fluid, such as steam or hydraulic fluid, along the surface of the rod or cylinder. The plurality or nest of packing rings (not illustrated) are usually nestled together so that the recess of one ring is filled or fitted over a conforming raised portion of an adjacent ring. The ring at the female terminal of the nest typically has its surface opposite the recessed surface substantially flat so as to seal against the flat restraining means of the stuffing box.

The ring packing 12 is composed of a plurality of elastomer coated fabric layers 20 as illustrated in FIG. 2 which have been molded under elevated temperature and pressure into a laminate unitary body of a desired configuration. Such molding operation, effected in suitable molding apparatus such as illustrated in FIG. 8 and more fully discussed herein, causes the elastomer coating 21 of each fabric layer 20 to blend together so as to strongly bond the fabric layers 20 and ultimately form a unitary body of alternating elastomer layers 21 and fabric layers 20.

As indicated, the molded laminate packing 12 suffers from several undesirable physical characteristics. Foremost of these is the tendency to wear excessively and delaminate, that is, the fabric layers 20 separate from each other. This, of course, causes the laminate packing 12 to ultimately break down and thus permits loss of high pressure fluid as well as increases the frictional resistance to movement of the reciprocating rod or piston. These undesirable physical characteristics are primarily due to or result from the conventional molding operation employed to prepare this type of laminate packing.

During the molding preparation, the fabric layers 20 forming the laminae of the packing 12 are compressed both to mold the fabric layers 20 together by a blending of the elastomer coatings 21 and additionally to form the desired configuration for the packing such as the annular ring 12 with its concentric recess 13. Such compression, however, of necessity dislocates and distorts the fabric layers 20 particularly those within the portions of the packing forming the projections 14 and 15. This dislocation of the fabric layers 20 is a principle cause for the poor physical characteristics of this type of packing, especially the tendency to delaminate.

FIGS. 3 and 5 illustrate the arrangement of the fabric layers 20 as typically occurs in conventional packing. It will be noticed by reference to such Figures that the laminate fabric layers 20, layers 20a, 20b and 20c in the exploded view of FIG. 5, are bunched or crowded together especially at the apex 16 of the recess 13 and in general have been displaced from essentially a uniformly spaced disposition and parallel relationship to each other. This dislocation is particularly evident in the projections 14 and 15. Moreover, and most significantly, the ends or terminal portions of the fabric layers 20a, 20b and 20c, as illustrated in FIG 5, have during the compression step of the molding operation been dislocated from their initial and desired perpendicular disposition to the wearing surface or side wall 18.

As can be observed from FIG. 5 which is a greatly exaggerated or exploded view of fabric layers 20a, 20b and 20c located within the area of projection 15 along the side wall or wearing surface 18, the tensile stress exerted upon the fabric layers 20 in the direction of the arrows causes the fabric layers 20 to be dislocated from essentially a perpendicular disposition to the wall or wearing surface 18. This dislocation produces a number of undesirable effects which adversely affect the physical characteristics of the packing. For example, as best illustrated in FIG. 5, the tensile stress on fabric layer 20a causes a portion of the elastomer coating 21 to be pulled along with fabric layer 20a forming a void or pocket 22 on the wearing surface or side wall 18. This void or pocket 22 accelerates the delamination of the adjacent layers 20a and 20b during the dynamic sealing operation of the packing 12. Fabric layer 20b under the tensile stress moves in the direction of the arrow permitting the elastomer coating 21 to fill in or flow into area 23 between the end of fabric layer 20b and the wearing surface or side wall 18. This creates a soft spot along the side wall 18 in the region of area 23, which lacking the support of the fabric layer 20b has a greatly reduced resistance to wear. The distortion of fabric layer 20c illustrates a further type of undesirable physical property resulting from the tensile stress applied to the fabric layer 20c during the compression molding preparation. Fabric layer 20c is pulled or rolled during the compression so that the lower surface 24 of the fabric layer 20c becomes exposed along the side wall 18 at point 25. Since the surface 24 of the fabric layer 20c usually has less resistance to wear than the end point of the fabric layer 20c, the side wall 18 at point 25 also has greatly reduced wear resistance.

It should be understood, of course, that the FIGS. 3 and 5 as well as FIGS. 2 and 4 are greatly exaggerated and idealized for illustrative purposes and may not in a technical sense represent exactly the arrangement or dislocation of the fabric layers 20 either in conventional packing or the packing of this invention. Such Figures do, however, illustrate the highly uniform arrangement of the fabric layers in the molded laminate packing of this invention particularly as compared to the fabric arrangement of conventional packing.

In this specification and appended claims, the fabric layers 20 are frequently referred to as being perpendicular to the wearing surface or side wall 18. Since side wall 18 is frequently cylindrical, this perpendicular disposition really means perpendicular as would appear in any radial cross-sectional plane as shown in FIG. 2, for example.

The dislocation of the fabric layers 20 in conventional packing as illustrated by FIGS. 3 and 5 may be contrasted with the arrangement of the fabric layers 20 in the packing of this invention as illustrated specifically by FIGS. 2 and 4. In FIG. 2, it may be observed that the fabric layers 20 are substantially uniformly spaced from each other in a parallel relationship and have not been substantially crowded or bunched together within the region of apex 16. This, of course, is in sharp contrast to the fabric layers 20 as illustrated in FIG. 3 for conventional packing. In addition, this substantial uniformity of the fabric layers 20 has been particularly preserved for the fabric layers 20 within the projections 14 and 15. Moreover, the fabric layers 20 are substantially uniformly and perpendicularly disposed at their end points to the side walls 17 and 18, particularly within the projections 14 and 15.

This essentially perpendicular disposition is better illustrated by FIG. 4 especially in contrast to the conventional arrangement of fabric layers 20 as shown in FIG. 5. As is readily apparent from FIG. 4, the fabric layers 20d, 20e and 20f, corresponding respectively to fabric layers 20a, 20b and 20c of FIG. 5, are not substantially distorted from a uniform disposition or parallel relationship to each other or essentially from a perpendicular disposition to the side wall or sealing surface 18. This uniform arrangement of the fabric layers 20d, 20e and 20f as shown in FIG. 4, provides greatly improved physical properties for the molded packing. For example, again in reference to FIG. 4 in contrast to FIG. 5, the fabric layers 20d, 20e and 20f have not been pulled or distorted from their respective positions and all of such fabric layers at their end points are substantially perpendicularly disposed to the side wall or wearing surface 18. Moreover, there are no voids formed along surface 18 such as void 22 of FIG. 5. There are no fabric-unsupported elastomer-rich areas such as area 23 of FIG. 5 and the bottom surface of the fabric layers are not exposed against the side wall 18 as shown at point 25 in FIG. 5 for fabric layer 20c. The absence of these physical defects in the packing of this invention obviously provides a molded laminate packing of increased and superior physical properties as compared to conventional molded laminate packing.

This improved molded laminate packing is achieved according to the method of this invention by the simple and readily carried out expedient of avoiding any substantial dislocation of the fabric layers 20, particularly those ultimately located within the portion of the packing forming projections 14 and 15, during the compression step of the molding preparation. This method is achieved basically by providing a blank or preform composed of a plurality of moldable elastomer coated fabric layers having a slit or narrow opening on one surface thereof and molding such blank or preform in a suitable molding apparatus under application of elevated temperature and pressure. The fabric layers particularly those ultimately located within the portion of the packing forming the projections defining the recess are maintained by virtue of such slit in substantially their initial uniform and parallel disposition to each other and essentially in a perpendicular disposition, especially at their terminal portions, to the wearing surface or side wall of the molded packing. This method will be more readily understood by reference to the attached drawings.

FIG. 6 illustrates a blank or preform 26 composed of a plurality of fabric layers 20 each baring and impregnated with an elastomer coating 21 which can be suitably employed in the method of this invention. These fabric layers 20 and their elastomer coatings 21 herein referred to frequently for convenience collectively as elastomer coated fabric layers 20 are capable of being molded under elevated temperature and pressure into a unitary body of desired configuration such as ring packing 12 of FIG. 1. The blank or preform 26 is illustrated in a preferred form or configuration as an annular ring and is shown in dimensional conformity for molding to the annular ring packing 12 of FIG. 1. The elastomer coated fabric layers 20 are arranged in blank 26 in laminate structure as a series of planes all essentially perpendicular to the sides 17 and 18 which ultimately form the side walls of the ring packing 12 and are so identified for convenient recognition. This arrangement of the fabric layers 20 in blank 26 is more clearly illustrated in FIG. 7 which shows the initial, substantial uniform disposition of the fabric layers 20 to each other in parallel relationship and their essential uniform and perpendicular disposition to the sides 17 and 18 of the blank 26.

The fabric layers 20 which in plurality form the blank 26 can comprise or consist of any of the materials conventionally employed for such purpose. For example, fibrous or woven fabrics such as asbestos, cotton duck or nylon may be suitably employed as the fabric layer 20. In similar fashion, any material conventionally employed as the coating for the fabric layers 20 which is capable of fusion under molding conditions of elevated temperature and pressure and which retains some degree of resiliency can be suitably used as the coating 20. For example, elastomers or rubbery polymers including both natural and synthetic rubbers such as homopolymers or copolymers of butadiene, isoprene, and similar aliphatic conjugated diolefin hydrocarbons such as butadiene-styrene copolymer rubber, butadiene-acrylonitrile copolymer rubber, butadiene-vinylpyridine copolymer rubber, isobutylene isoprene copolymer rubber, ethylene-propylene-conjugated diolefin or non-conjugated diolefin terpolymers of polychloroprene can be employed as resilient coating 21.

The dimensions of the blank 26 and the corresponding molded laminate packing ultimately obtained can be widely varied and any particular combination of dimensions selected will depend upon the intended application for such packing. These application factors will also govern the choice of fabric and the coating for fabric layer 20 and coating 21 respectively with the selection in any particular instance being primarily dependent upon the environment in which the packing is to be used. The number of elastomer coated fabric layers 20 which in any instance are employed to form the blank 26 will also vary depending upon such factors as the intended application for the packing and the type of elastomer and fabric used.

The preform or blank 26 is provided for use in the method of this invention with a narrow opening or slit 27 on one surface of the blank. As illustrated in FIGS. 6 and 7, the slit 27 extends concentrically along such surface and inwardly into the blank in a direction essentially perpendicular to the coated fabric layers 20. The slit 27 is further shown in a preferred position essentially at the mid-point distance between the sides 17 and 18 and further extending inwardly into the packing 26 a distance of approximately from about one-third to one-half of the depth of blank 26. The blank 26 with the concentric slit 27 can be obtained or prepared basically, with one major deviation, according to any of the procedures conventionally used to prepare such blanks or preforms. One of these preferred procedures is more fully described hereinafter.

The blank 26 provided with the slit 27 for use in the method of this invention is placed into a suitable molding apparatus 28 as illustrated in FIG. 8. The apparatus 28, diagramed in simple and uncomplicated fashion, is composed essentially of a die-plunger 29 arranged for operable cooperation with a die-cavity 30 defined by restraining sides 31 and 32 and bottom 33. Both the die-plunger 29 and die-cavity 30 can be combined with or form a part of any conventional molding apparatus. For example, the die-plunger 29 can typically be connected to or supported by a mechanically driven die-plunger assembly 34, while the die-cavity 30 is usually mounted in or associated with an immobile die-cavity support 35. The die-plunger 29 and/or die-cavity 30 can be suitably heated so as to provide the desired elevated temperature to mold the blank 26 into a unitary body according to any of the standard procedures, for example, by resistance heating.

The blank 26 is positioned for molding according to the method of this invention in the die-cavity 30 which is adapted so as to receive the blank 26, and when the die-plunger 29 is moved downwardly, to compress the blank 26 into the desired configuration. In such compression operation, sides 31 and 32 and bottom 33 of the die-cavity 30 act as restraints for the blank and mold the blank into a conforming shape.

The die-plunger 29 is adapted primarily so as to form during the compression step the elongated recess or groove 13 of the ring packing 12. This is achieved by designing the apex 36 of the die-plunger 29 and contacting sides 37 and 38 so that during the compression, the surface of the blank 26 having the slit 27 is shaped into the particular contour desired for the recess 13. The die-plunger 29, and more particularly the die-plunger apex 36, is further adapted and adjusted so that during the compression step of the molding operation, the apex 36 first contacts or engages the blank 26 at the slit 27 and then continues downwardly into the slit 27 pushing the laminate layers 20 aside along die-plunger sides 37 and 38 while simultaneously forming the recess groove 13. As the compression continues by downward movement of the die-plunger 29, the slit 27 offers a yielding resistance to the die-plunger 29 and substantially prevents any material dislocation of the elastomer coated fabric layers 20 from their initial, essentially parallel disposition to each other as from their initial uniform and perpendicular disposition to the sides 18 and 19 of blank 26.

This procedural result is further and more clearly illustrated by FIG. 9 which shows a cross-sectional view of the die-plunger 29 and die-cavity 30 in substantially a closed or substantially compressed position, compressing the blank 26 into the desired configuration. As may be observed by reference to FIG. 9, the slit 27 has permitted the die-plunger 29 to compress the blank 26 but because the slit 27 has cut or severed the fabric layers 20, little or no tensile stress has been applied to such fabric layers 20 so as to cause any major distortion from their original uniform disposition to each other or from their essential uniform perpendicular disposition to the sides 17 and 18 of the blank 26. It should be noted in FIG. 9 that only a small remaining portion of the original slit 27 is shown. A further slight downward movement of the die-plunger 29 into a fully compressed position will have completely traveled the full original depth of the slit 27. Thus, when the compression step is complete, there will not be any substantial number of slitted fabric layers 20 remaining.

Thus, through this rather simple expedient of utilizing a blank or preform 26 having a slit or narrow opening 27, a unitary body of a molded laminate packing is obtained which has superior and improved physical properties as compared to conventional molded laminate packing prepared in a comparable molding operation.

Figure 11:
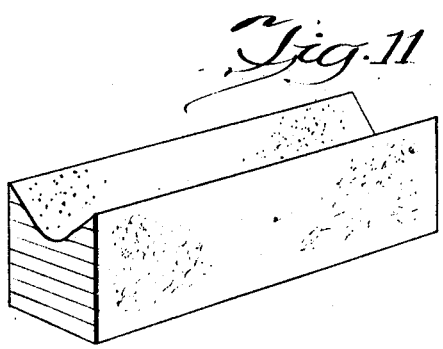
FIG. 11 is a perspective view of an alternate packing of this invention having a rectangular configuration.

The molded laminate packing of this invention with its superior physical properties can be produced to have a wide variety of different configurations through utilization of a slitted blank or preform analogous to the blank 26 of FIG. 6. For example, while the packing 12 of FIG. 1 and its precursor preform or blank 26 of FIG. 6 are illustrated in a preferred form as annular rings, other configurations may also be obtained for the molded laminate packing without substantial departure from this invention. Specifically, instead of an annular ring configuration, molded laminate packing can be prepared in the form of a bar or rectangle such as illustrated in FIG. 11 through utilization of a blank (not illustrated) in corresponding rectangular form having a slit analogus to slit 27 of blank 6. Still another configuration is illustrated by FIG. 12 which shows an elongated bar, such as shown in FIG. 11 wound into a spiral. Such packing again like the bar of FIG. 11 can be prepared in a fashion similar to the ring packing of FIG. 1 by employing an elongated blank (not illustrated) having a slit analogous to slit 27.

Figure 10:
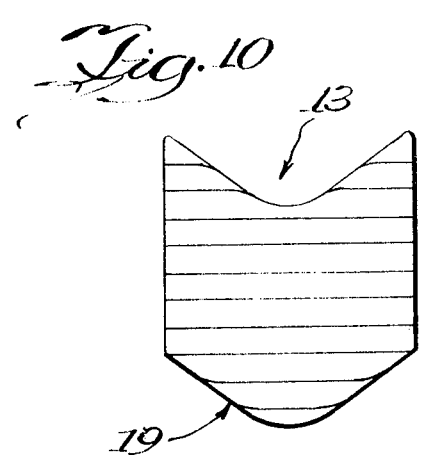
FIG. 10 is a view analogous to FIG. 2 but illustrating an alternate arrangement of the surface or bottom of the packing opposite the recessed surface with a raised portion having a cross-sectional contour conforming to the contour of the recess.

The configuration of the preferred annular and recessed ring can also be varied somewhat to obtain ring packings adapted for specific sealing applications. For example, while the surface or bottom 19 of the annular ring 12 opposite the recess 13 is illustrated as being substantially horizontal or flat, such surface can have a different shape or cross-sectional contour. One particularly preferred shape or contour is illustrated in cross-section in FIG. 10. The surface or bottom 19 as shown in FIG. 10 has a raised portion which has a cross-sectional contour conforming to that of the groove 13. This type of raised surface 19 can be readily obtained in the method of this invention by simply adapting the bottom 33 of the die-cavity 30 so as to shape bottom surface 19 into such contour during the compression step of the molding operation. In similar fashion, the cross-sectional contour of the recess 13 can be varied to obtain different, contour arrangements. This can be readily accomplished by simply adapting contacting sides 37 and 38 of the die-plunger 29 as shown in FIGS. 8 and 9 so as to form the desired contour shape for the recess 13 during the compression molding. In this regard, annular ring packings where the cross-sectional contour of the recess is either U- or V-shaped are particularly preferred.

As is obvious, through suitable modification of the die-plunger 29 and die-cavity 30, various combinations can be obtained for the cross-sectional contour of the recess 13 and the bottom surface 19. As previously mentioned, ring packings where the cross-sectional contour of the recess 13 is V-shaped and where the bottom surface 19 is raised having a cross-sectional V-shaped contour in conformance with that of the V-shaped recess are highly suitable for use as intermediate rings in a nest of similar ring packings. Also, ring packings having the cross-sectional contour of the recess 13 in V-shape and the surface 19 essentially flat make an excellent female terminal ring for such nest of rings.

As indicated, the blank or preform 26 having slit 27 according to this invention can be prepared in a variety of ways. One method particularly suitable for preparation of such blank essentially follows the procedure disclosed in U. S. Pat. No. 2,255,504. The major deviation from such procedure is, of course, to provide the slit 27 as shown in FIG. 6. In this preparational procedure (which is not illustrated in the attached drawings) a continuous fabric strip of suitable material such as cotton duck or asbestos coated and/or impregnated with an appropriate resilient coating, for example, an elastomer such as a rubbery polymer is wound upon a cylindrical mandrel to form a spirally coiled annular roll of such coated fabric. The roll of coiled, coated fabric is then cut through to the mandrel to form a series of annular rings or cores of desired width. This is achieved by slicing the roll of coiled coated fabric at measured distances conforming to the desired widths along the axis of the roll. These rings or cores thus prepared become the blank 26. Where a spiral coil such as shown in FIG. 12 is desired, the corresponding spiral blank can be prepared simply by permitting the knife slicing the roll to move continuously along the axis of the roll so as to make a spiral cut as the roll is turned.

To provide the slit 27 in these blanks, the blanks or rings while still on the mandrel are cut or slit downwardly partially through the plurality of coiled fabric layers to the depth desired for the slit 27. This slit is preferably made at a point approximately midway between the side walls of each blank. The depth of the cut or slit 27 can obviously be easily and readily varied. The particular depth of the slit 27 as well as its width will depend upon a number of variables such as the type of resilient coating and fabric and the desired cross-sectional contour and depth of the recess 13 of the packing prepared from the core or blank having such slit. For most applications, however, the slit is quite narrow and its depth ranges from about one-half to one-third of the thickness of the blank.

As prepared in this procedure, the slitted core or blank requires reorientation of its respective surfaces so as to conform to the arrangement of surfaces of the blank 26 as shown in FIG. 6. For example, referring to FIG. 6, as the core or blank 26 is removed from the mandrel, the surface having the slit 27 is in the position of outside surface wall 17. To reorientate the blank so as to have the surface with the slit 27 in the position shown in FIG. 6, it is only necessary to rotate such surface having slit 27 and hence the entire blank through an angle of 90°. This general procedure is amply described in the aforementioned U. S. Pat. No. 2,255,504 and as indicated therein the rotation of the blank 26 to proper surface orientation for molding can be achieved, if desired, while inserting the blank 26 into the die-cavity 30 of the molding apparatus 28 of FIG. 8.

I claim:

1. A molded laminate packing comprising a stack of elongated, essentially parallel elastomer coated and impregnated fabric layers of the same size and aligned one on top of the other and bonded together in face to face contact by fusion of the elastomer coating under molding conditions and forming alternating elastomer and fabric layers with a groove extending a depth from an outerface surface and through several layers and the length of the elongated stack.

2. The packing of claim 1 wherein the outerface surface opposite that of the grooved outerface surface has a raised portion having a cross-sectional contour conforming to that of the groove.

3. The packing of claim 1 wherein the outerface surface opposite the grooved outerface surface is substantially flat.

4. The packing of claim 1 wherein the cross-sectional contour of the groove is essentially U-shaped.

5. The packing of claim 1 wherein the cross-sectional contour of the groove is essentially V-shaped.

6. The packing according to claim 1 wherein it is in the configuration of an annular ring.

7. The packing according to claim 6 wherein the groove extends annularly on an outerface surface and the outerface surface opposite the grooved outerface surface is essentially flat.

8. The packing according to claim 7 wherein the cross-sectional contour of the groove is essentially U-shaped.

9. The packing according to claim 7 wherein the cross-sectional contour of the groove is essentially V-shaped.

10. The packing according to claim 6 wherein the groove extends annularly on an outerface surface of the body, the outerface surface opposite the grooved outerface surface is shaped to form a raised portion having a cross-sectional contour conforming to that of the groove, and the cross-sectional contour of the groove is essentially V-shaped.

11. A method for preparing a laminate packing comprising a stack of elongated, essentially parallel elastomer coated and impregnated fabric layers bonded together face to face by fusion of the elastomer coating under molding conditions and forming alternating elastomer and fabric layers with a groove extending a depth from an outerface surface and through several layers and the length of the elongated stack which method comprises (1) providing a stack of equally sized elastomer coated and impregnated fabric layers, (2) slitting the stack perpendicular to the layers from an outerface surface of an exterior layer a depth of several layers and the length of the stack, (3) molding with a configured mold such slitted stack under application of elevated temperature and pressure to produce the laminate packing of desired configuration with the molding acting on and through the slitted layers to form the groove.

12. The method of claim 11 wherein the stack provided is in the form of an annular ring, the slit extends annularly along one outerface surface of the ring, and the packing produced has a corresponding annular ring configuration with the groove extending annularly on the outer face surface of the body corresponding to the slitted surface of the stack.

13. The method of claim 11 wherein during the molding, an essentially flat outerface surface is formed opposite the grooved outerface surface.

14. The method of claim 13 wherein during the molding, the cross-sectional contour of the groove is formed essentially into a U-shape.

15. The method of claim 13 wherein during the molding, the cross-sectional contour of the groove is formed essentially into a V-shape.

16. The method of claim 12 wherein during the molding, the cross-sectional contour of the groove is formed essentially into a V-shape and a raised portion on the outerface surface opposite the grooved outerface surface is formed having a cross-sectional contour which corresponds to that of the groove.

* * * * *